(12) United States Patent
Vignocchi et al.

(10) Patent No.: US 8,972,369 B2
(45) Date of Patent: Mar. 3, 2015

(54) PROVIDING A COMMON VIRTUAL ITEM REPOSITORY IN A VIRTUAL SPACE

(71) Applicant: Disney Enterprises, Inc., Burbank, CA (US)

(72) Inventors: John G. Vignocchi, Studio City, CA (US); Jeffrey Bunker, Cedar Hills, UT (US); Manfred Neber, Salt Lake City, UT (US); Jeffrey Gosztyla, Salt Lake City, UT (US); Chad Liddell, Taylorsville, UT (US); Marcus Fisher, Salt Lake City, UT (US); Troy Leavitt, West Valley City, UT (US); Jared Bals, Salt Lake City, UT (US); John Blackburn, Bountiful, UT (US); Robert Lowe, Layton, UT (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 13/752,257

(22) Filed: Jan. 28, 2013

(65) Prior Publication Data
US 2014/0181062 A1 Jun. 26, 2014

Related U.S. Application Data

(60) Provisional application No. 61/746,052, filed on Dec. 26, 2012.

(51) Int. Cl.
G06F 17/30 (2006.01)
(52) U.S. Cl.
CPC .............................. *G06F 17/30233* (2013.01)
USPC ........................................ 707/705; 710/736

(58) Field of Classification Search
CPC ................... G06F 17/30026; G06F 17/30038; G06F 17/30041; G06Q 30/06; G06Q 10/10; A63F 13/12; A63F 2300/407
USPC ........ 348/22, 26; 707/705, 710, 736; 715/757
See application file for complete search history.

(56) References Cited

U.S. PATENT DOCUMENTS

| 5,190,285 A | 3/1993 | Levy et al. .................. 273/85 G |
| 5,766,077 A | 6/1998 | Hongo ............................. 463/30 |

(Continued)

FOREIGN PATENT DOCUMENTS

| GB | 2 365 364 | 2/2002 |
| WO | WO 01/69572 | 9/2001 |

(Continued)

OTHER PUBLICATIONS

U.S. Appl. No. 60/151,586, filed Aug. 30, 1999 in the name of Tony Forrest Rodriguez, 4 pages.

(Continued)

*Primary Examiner* — Syling Yen
*Assistant Examiner* — Ahmed Abraham
(74) *Attorney, Agent, or Firm* — Pillsbury Winthrop Shaw Pittman LLP

(57) ABSTRACT

Virtual items may be unlocked in a virtual space responsive to physical token detection. A common virtual item repository may be provided in the virtual space. Once unlocked, a given virtual item may be accessible to multiple characters in the virtual space via the virtual item repository. Customization of a virtual space may be facilitated. The customization may be based on the virtual items accessible via the virtual item repository.

17 Claims, 5 Drawing Sheets

(56) References Cited

U.S. PATENT DOCUMENTS

| | | | |
|---|---|---|---|
| 5,853,327 A | 12/1998 | Gilboa | 463/39 |
| 5,855,483 A | 1/1999 | Collins et al. | 434/322 |
| 6,354,947 B1 | 3/2002 | Dobrusskin et al. | 463/43 |
| 6,361,396 B1 | 3/2002 | Snyder et al. | 446/397 |
| 6,364,735 B1 | 4/2002 | Bristow et al. | 446/397 |
| 6,650,870 B2 | 11/2003 | White et al. | 455/41 |
| 6,735,324 B1 | 5/2004 | McKinley et al. | 382/100 |
| 6,761,637 B2 | 7/2004 | Weston et al. | 463/42 |
| 6,773,325 B1 | 8/2004 | Mawle et al. | 446/175 |
| 6,835,131 B1 | 12/2004 | White et al. | 463/1 |
| 6,877,096 B1 | 4/2005 | Chung et al. | 713/185 |
| 6,967,566 B2 | 11/2005 | Weston et al. | 340/323 R |
| 7,001,276 B2 | 2/2006 | Shinoda | 463/25 |
| 7,066,781 B2 | 6/2006 | Weston | 446/268 |
| 7,081,033 B1 | 7/2006 | Mawle et al. | 446/175 |
| 7,244,183 B1 | 7/2007 | England | 463/48 |
| 7,297,063 B2 | 11/2007 | Fujisawa et al. | 463/43 |
| D559,327 S | 1/2008 | Luk et al. | D21/332 |
| 7,338,377 B2 | 3/2008 | Shinoda | 463/47 |
| 7,426,642 B2 | 9/2008 | Aupperle et al. | 713/185 |
| 7,488,231 B2 | 2/2009 | Weston | 446/175 |
| 7,502,759 B2 | 3/2009 | Hannigan et al. | 705/51 |
| 7,534,157 B2 | 5/2009 | Ganz | 446/175 |
| 7,636,783 B2 | 12/2009 | Heutchy et al. | 709/227 |
| 7,677,948 B2 | 3/2010 | Ganz | 446/175 |
| D620,256 S | 7/2010 | Fujimura et al. | D3/294 |
| D620,257 S | 7/2010 | Fujimura et al. | D3/294 |
| 7,789,726 B2 | 9/2010 | Ganz | 446/175 |
| D626,978 S | 11/2010 | Huh | D15/126 |
| 7,843,334 B2 | 11/2010 | Kumagai et al. | 340/539.13 |
| 7,843,471 B2 | 11/2010 | Doan et al. | 345/633 |
| 7,846,004 B2 | 12/2010 | Ganz | 446/175 |
| 7,883,416 B2 | 2/2011 | Dobrusskin et al. | 463/37 |
| 7,883,420 B2 | 2/2011 | Bradbury et al. | 463/43 |
| 7,886,156 B2 | 2/2011 | Franchi | 713/186 |
| 7,905,779 B2 | 3/2011 | Dyke et al. | 463/30 |
| 7,933,968 B1 | 4/2011 | Zimmerman | 709/217 |
| 8,002,605 B2 | 8/2011 | Ganz | 446/175 |
| D645,910 S | 9/2011 | Foster et al. | D21/333 |
| 8,025,573 B2 | 9/2011 | Stenton et al. | 463/43 |
| 8,033,901 B2 | 10/2011 | Wood | 463/1 |
| D657,426 S | 4/2012 | Gomez | D21/330 |
| D666,249 S | 8/2012 | Jennings et al. | D21/333 |
| 8,323,068 B2 | 12/2012 | Ganetakos et al. | 446/175 |
| 8,401,913 B2 | 3/2013 | Alivandi | 705/26.1 |
| D680,594 S | 4/2013 | Mercier et al. | D21/330 |
| D687,106 S | 7/2013 | Menting | D21/398 |
| 8,726,172 B1 | 5/2014 | Vignocchi et al. | 715/757 |
| D710,945 S | 8/2014 | Biheller et al. | D21/333 |
| 8,864,589 B2 | 10/2014 | Reiche, III | 463/44 |
| 8,904,298 B2 | 12/2014 | Nelson et al. | 715/757 |
| 8,909,920 B2 | 12/2014 | Vignocchi et al. | 713/159 |
| 8,910,266 B2 | 12/2014 | Vignocchi et al. | 726/9 |
| 2003/0037075 A1 | 2/2003 | Hannigan et al. | 707/500 |
| 2004/0029625 A1 | 2/2004 | Annunziata | 463/1 |
| 2004/0092311 A1 | 5/2004 | Weston et al. | 463/42 |
| 2004/0266505 A1* | 12/2004 | Keam et al. | 463/1 |
| 2005/0245302 A1 | 11/2005 | Bathiche et al. | 463/1 |
| 2006/0009287 A1 | 1/2006 | Engelfriet | 463/35 |
| 2006/0094501 A1 | 5/2006 | O'Leary et al. | 463/30 |
| 2007/0015588 A1 | 1/2007 | Matsumoto et al. | 463/43 |
| 2007/0087839 A1 | 4/2007 | Bradbury et al. | 463/43 |
| 2007/0197297 A1 | 8/2007 | Witchey | 463/42 |
| 2007/0211047 A1 | 9/2007 | Doan et al. | 345/473 |
| 2008/0085773 A1 | 4/2008 | Wood | 463/43 |
| 2008/0161113 A1 | 7/2008 | Hansen et al. | 463/42 |
| 2008/0280684 A1* | 11/2008 | McBride et al. | 463/42 |
| 2008/0300053 A1* | 12/2008 | Muller | 463/30 |
| 2009/0002377 A1* | 1/2009 | Lee et al. | 345/473 |
| 2009/0023487 A1 | 1/2009 | Gilson et al. | 463/11 |
| 2009/0053970 A1 | 2/2009 | Borge | 446/268 |
| 2009/0137323 A1 | 5/2009 | Fiegener et al. | 463/43 |
| 2009/0197658 A1 | 8/2009 | Polchin | 463/9 |
| 2009/0203446 A1 | 8/2009 | Bradbury et al. | 463/40 |
| 2009/0291764 A1 | 11/2009 | Kirkman et al. | 463/43 |
| 2009/0307611 A1 | 12/2009 | Riley | 715/757 |
| 2010/0023492 A1 | 1/2010 | Lucas | 707/3 |
| 2010/0151940 A1 | 6/2010 | Borge | 463/29 |
| 2011/0045913 A1* | 2/2011 | Walker et al. | 463/42 |
| 2011/0107239 A1* | 5/2011 | Adoni et al. | 715/757 |
| 2011/0231781 A1 | 9/2011 | Betzler et al. | 715/757 |
| 2011/0250954 A1 | 10/2011 | Braund | 463/29 |
| 2011/0263322 A1* | 10/2011 | Van Luchene | 463/29 |
| 2011/0263332 A1* | 10/2011 | Mizrachi | 463/42 |
| 2011/0288914 A1* | 11/2011 | Guthrie | 705/14.4 |
| 2011/0294574 A1 | 12/2011 | Yamada et al. | 463/30 |
| 2012/0015748 A1 | 1/2012 | Osada | 463/43 |
| 2012/0064968 A1* | 3/2012 | Youm et al. | 463/29 |
| 2012/0142429 A1 | 6/2012 | Muller | 463/42 |
| 2012/0172131 A1* | 7/2012 | Boswell et al. | 463/42 |
| 2012/0238362 A1 | 9/2012 | Janis et al. | 463/31 |
| 2012/0295702 A1 | 11/2012 | Otero et al. | 463/31 |
| 2012/0295703 A1 | 11/2012 | Reiche et al. | 763/31 |
| 2012/0295704 A1 | 11/2012 | Reiche et al. | 463/31 |
| 2012/0302356 A1 | 11/2012 | Annunziata | 463/42 |
| 2012/0311688 A1 | 12/2012 | Lemus et al. | 726/8 |
| 2012/0315983 A1 | 12/2012 | Miller, IV et al. | 463/29 |
| 2012/0331529 A1 | 12/2012 | Ibel et al. | 726/4 |
| 2013/0079132 A1 | 3/2013 | Archer et al. | 463/31 |
| 2013/0290137 A1* | 10/2013 | Olomskiy | 705/26.41 |
| 2013/0290147 A1* | 10/2013 | Chandra et al. | 705/27.1 |
| 2013/0296043 A1 | 11/2013 | Weinshanker et al. | 463/30 |
| 2014/0066209 A1 | 3/2014 | Annambhotla | 463/42 |
| 2014/0176534 A1 | 6/2014 | Vignocchi et al. | 345/419 |
| 2014/0179418 A1 | 6/2014 | Vignocchi et al. | 463/29 |
| 2014/0179443 A1 | 6/2014 | Vignocchi et al. | 463/43 |
| 2014/0179444 A1 | 6/2014 | Vignocchi et al. | 463/43 |
| 2014/0181507 A1 | 6/2014 | Vignocchi et al. | 713/159 |
| 2014/0181706 A1 | 6/2014 | Vignocchi | 715/764 |
| 2014/0181820 A1 | 6/2014 | Vignocchi et al. | 718/100 |
| 2014/0181994 A1 | 6/2014 | Vignocchi et al. | 726/28 |
| 2014/0223534 A1 | 8/2014 | Vignocchi et al. | 726/9 |
| 2014/0304624 A1 | 10/2014 | Nelson, et al. | 715/757 |

FOREIGN PATENT DOCUMENTS

| | | |
|---|---|---|
| WO | WO 01/69830 | 9/2001 |
| WO | WO 03/043709 | 5/2003 |
| WO | WO 2007/101785 | 9/2007 |

OTHER PUBLICATIONS

U.S. Appl. No. 60/288,272, filed May 2, 2001 in the name of Ravi K. Sharma et al., 31 pages.

U.S. Appl. No. 60/297,229, filed Jun. 7, 2001 in the name of Brett T. Hannigan et al., 46 pages.

U.S. Appl. No. 60/335,908, filed Nov. 14, 2001 in the name of Stephen C. Beck, 120 pages.

U.S. Appl. No. 60/355,856, filed Feb. 10, 2002 in the name of Brett T. Hannigan et al., 53 pages.

Varney, Allen et al., "Paranoia XP", Mongoose Publishing, Dec. 31, 2004, ISBN: 978-1-904854-26-5, retrieved from the Internet: URL:http://fc09.deviantart.net/fs71/f/2012/316/e/6/paranoia_player_section_by_atta_crossroads-d4zxv52.pdf, retrieved Apr. 16, 2014, 110 pages.

Diablo III, Wikipedia.org, online, accessed via the Internet, accessed Jun. 26, 2014, URL: <http://en.wikipedia.org/wiki/Diablo_III>, 25 pages.

Stash, Diablowiki.net, online, accessed via the Internet, accessed Jun. 26, 2014, URL: <http://www.diablowiki.net/Stash>, 7 pages.

Gear Sets, Diablowiki.net, online, accessed via the Internet, accessed Jun. 26, 2014, URL: <http://www.diablowiki.net/Gear_sets>, 8 pages.

Weapons, Diablowiki.net, online, accessed via the Internet, accessed Jun. 26, 2014, URL: <http://www.diablowiki.net/Weapons>, 7 pages.

Fundamentals, Battle.net, online, accessed via the Internet, accessed Jun. 26, 2014, URL: <http://us.battle.net/d3/en/game/guide/gameplay/fundamentals>, 13 pages.

Inventory, Battlet.net, online, accessed via the Internet, accessed Jun. 26, 2014, URL: <http://us.battle.net/d3/en/game/guide/items/inventory>, 9 pages.

(56) References Cited

OTHER PUBLICATIONS

Toy Story 3: The Video Game, Wikipedia.org, online, accessed via the Internet, accessed Jun. 26, 2014, URL: <http:/en.wikipedia.org/wiki/Toy_Story_3:_The_Video_Game>, 10 pages.
Toy Story 3 Toy Box Mode Demo, Youtube.com, online, May 8, 2010, accessed via the Internet, accessed Jun. 26, 2014, URL: <http://www.youtube.com/watch?v=Do84qnpfUvQ>, 2 pages.
Crecente, Brian, "Diving Into Toy Story 3's Toy Box", Kotaku.com, online, May 20, 2010, accessed via the Internet, accessed Jun. 26, 2014, URL: <http://kotaku.com/5543513/diving-into-toy-story-3s-toy-box>, 4 pages.
Whitehead, Dan, "Toy Story 3 Page 2", Eurogamer.net, online, Jul. 14, 2010, accessed via the Internet, accessed Jun. 26, 2014, URL: <http://www.eurogamer.net/articles/toy-story-3-review?page=2>, 2 pages.
[Guide] Item Drops That Starts Quest [LvL 1-85 Zones]. Eu.battle.net. Online. Dec. 31, 2010. Accessed via the Internet. Accessed Nov. 13, 2014. <URL:http://eu.battle.net/wow/en/forum/topic/1415204550>, 18 pages.
Blood Elf Plans. Eu.battle.net. Online. Accessed via the Internet. Accessed Nov. 13, 2014. <URL:http://eu.battle.net/wow/en/item/24414>, 2 pages.

* cited by examiner

PROVIDING A COMMON VIRTUAL ITEM REPOSITORY IN A VIRTUAL SPACE

FIELD OF THE DISCLOSURE

This disclosure relates to providing a common virtual item repository in a virtual space.

BACKGROUND

Conventionally, various virtual items in a virtual space may be accessed. Such access, however, may be typically based on a stage or level of completion of gameplay within the virtual space. For example, in a videogame, a given virtual item may be accessed responsive to a user reaching a certain level of gameplay. Furthermore, for a given character, the availability of specific virtual items may be limited to the virtual items belonging to the given character.

SUMMARY

One aspect of the disclosure relates a system configured to unlock virtual items in a virtual space responsive to physical token detection, provide a common virtual item repository in a virtual space, and/or facilitate customization of a virtual space based on accessible virtual items, in accordance with one or more implementations. In exemplary implementations, virtual items may be unlocked in the virtual space responsive to physical token detection. A common virtual item repository may be provided in the virtual space. Once unlocked, a given virtual item may be accessible to multiple characters in the virtual space via the virtual item repository. Customization of a virtual space may be facilitated. The customization may be based on the virtual items accessible via the virtual item repository.

The system may include one or more virtual space platforms. The virtual space platform(s) may be configured to execute one or more computer program modules. The computer program modules may include one or more of a user module, a space module, a token detection module, a virtual item unlocking module, a virtual item repository module, a space modification module, and/or other modules. The user module may be configured to access and/or manage one or more user profiles and/or user information associated with users of the system. The space module may be configured to implement the instance of the virtual space executed by the computer modules to determine views of the virtual space.

The token detection module may be configured to detect tokens based on signals received from a token reader. A given token may be a standalone physical object. The given token may be associated with a given character and/or a given virtual item. The given virtual item may be associated with the given character. In some implementations, the given virtual item may be associated with the given character based on a theme shared by the given virtual item and the given character. In some implementations, the given token may be configured to depict the given character and/or the given virtual item. The given virtual item may be accessible in the virtual space responsive to the given token being detected. Individual tokens may be configured to be detectable by the token reader.

The virtual item unlocking module may be configured to unlock individual ones of a plurality of virtual items responsive to individual tokens being detected. Where the plurality of virtual items include the first virtual item and a second virtual item, the first virtual item may be unlocked responsive to the first token being detected and the second virtual item may be unlocked responsive to the second token being detected. The plurality of virtual items may include one or more of an accessory, a virtual good, and/or other virtual items. A previously-locked virtual item may become accessible to one or more characters responsive to being unlocked. That is, until a given virtual item is unlocked, it may not be accessible to any characters. In some implementations, a given character accessing a given virtual item may include the given character utilizing the given virtual item.

According to some implementations, the virtual item unlocking module may be configured to unlock individual ones of the plurality of virtual items responsive to a performance of one or more game mechanisms associated with the virtual space. A game mechanism may include an action, a mission, a quest, a task, and/or other game mechanism. In some implementations, unlocking a given virtual item may require both a given token being detected and a given game mechanism being performed.

The virtual item repository module may be configured to provide a virtual item repository within the virtual space. The virtual item repository may be configured to facilitate and/or provide access by a plurality of characters to a plurality of virtual items. Where the plurality of characters include the first character and the second character, the plurality of virtual items may include a first virtual item associated with the first character and a second virtual item associated with the second character. The first virtual item may be accessible to the second character via the virtual item repository. The second virtual item may be accessible to the first character via the virtual item repository.

In some implementations, the virtual item repository may be visually represented at a location within the virtual space. By way of non-limiting example, the virtual item repository may be visually represented as a toy box within the virtual space. In some implementations, a given character may be required to be located proximally with the visual representation of the virtual item repository in order to access individual ones of the plurality of virtual items. For example, the given character may be required to stand next to, enter, and/or otherwise be located proximally with the visual representation of the virtual item repository in order to access a given virtual item.

According to some implementations, individual ones of the plurality of virtual items made accessible by the virtual item repository may be accessible to a given character via an inventory associated with the given character. The inventory may be accessible via a menu and/or other interface associated with the virtual space.

Accessibility of virtual items via the virtual item repository may vary according to different implementations. In some implementations, the virtual item repository may be configured such that a given virtual item is accessed by two or more characters at a given time. In some implementations, the virtual item repository may be configured such that a given virtual item is accessed by one single character at a given time. The one single character may be required to relinquish the given virtual item in order for the given virtual item to be accessed by another character.

The space modification module may be configured to facilitate modifications to one or more aspects of the virtual space. The one or more aspects of the virtual space may include objectives associated with the virtual space, an environment of the virtual space, a theme of the virtual space, and/or other aspects of the virtual space. Generally speaking, a given objective may be a purpose or goal that efforts or actions within the virtual space are intended to attain or accomplish. By way of non-limiting example, an objective may include a set of actions that must be performed by a user character in order to advance to a next level of gameplay in the virtual space.

The environment may be an aggregate of surroundings and conditions of the virtual space. By way on non-limiting example, the surroundings of the virtual space may include one or more of the appearance of the virtual space, a color scheme of the virtual space, a sound and/or soundtrack associated with the virtual space, and/or other aspects of the surroundings of the virtual space. The conditions of the virtual space may include one or more of laws of nature (e.g., gravity) of the virtual space, weather depicted in the virtual space, and/or other aspects of the conditions of the virtual space. Modifying the environment may include modifying one or both of the surroundings or the conditions of the virtual space.

The theme of the virtual space may be a unifying subject associated with the virtual space. A given character may be one of a given plurality of characters associated with a given theme. Modifying the theme of the virtual space based on the given theme may include incorporating one or more attributes of the given theme in the theme of the virtual space. Examples of such attributes may include one or more of objects, designs, symbols, color schemes, music, and/or other attributes that identify a given theme.

Modifications to the virtual space may be based on individual ones of the plurality of virtual items made accessible by the virtual item repository. For example, in some implementations, a given virtual item having a given theme may be required to be accessible via the virtual item repository in order for a thematic modification to the virtual space based on the given theme to be effectuated. The modifications to the virtual space may be made automatically based on individual ones of the plurality of virtual items made accessible by the virtual item repository.

In some implementations, the space modification module may be configured such that modifications made to one or more aspects of the virtual space are associated with individual characters. That is, a first modification associated with the first character may cause the virtual space to be perceived in a first manner by the first character. A second modification associated with the second character may cause the virtual space to be perceived in a second manner by the second character. The first manner may be different from the second manner. By way of non-limiting example, the first character may perceive the virtual space at nighttime, while the second character may perceive the virtual space in the daytime. The first character may perceive the virtual space in the first manner responsive to accessing a given virtual item. The second character may perceive the virtual space in the second manner responsive to accessing another given virtual item.

The space modification module may be configured to provide a space editor interface. The space editor interface may be configured to receive user input associated with the one or more aspects of the virtual space. Modifications to the virtual space may be based on the user input. In some implementations, the user input may be restricted based on individual ones of the plurality of virtual items made accessible by the virtual item repository. The user input provided by a given user may be restricted based on one or more virtual items accessed by a given character, where the given character is associated with the given user.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
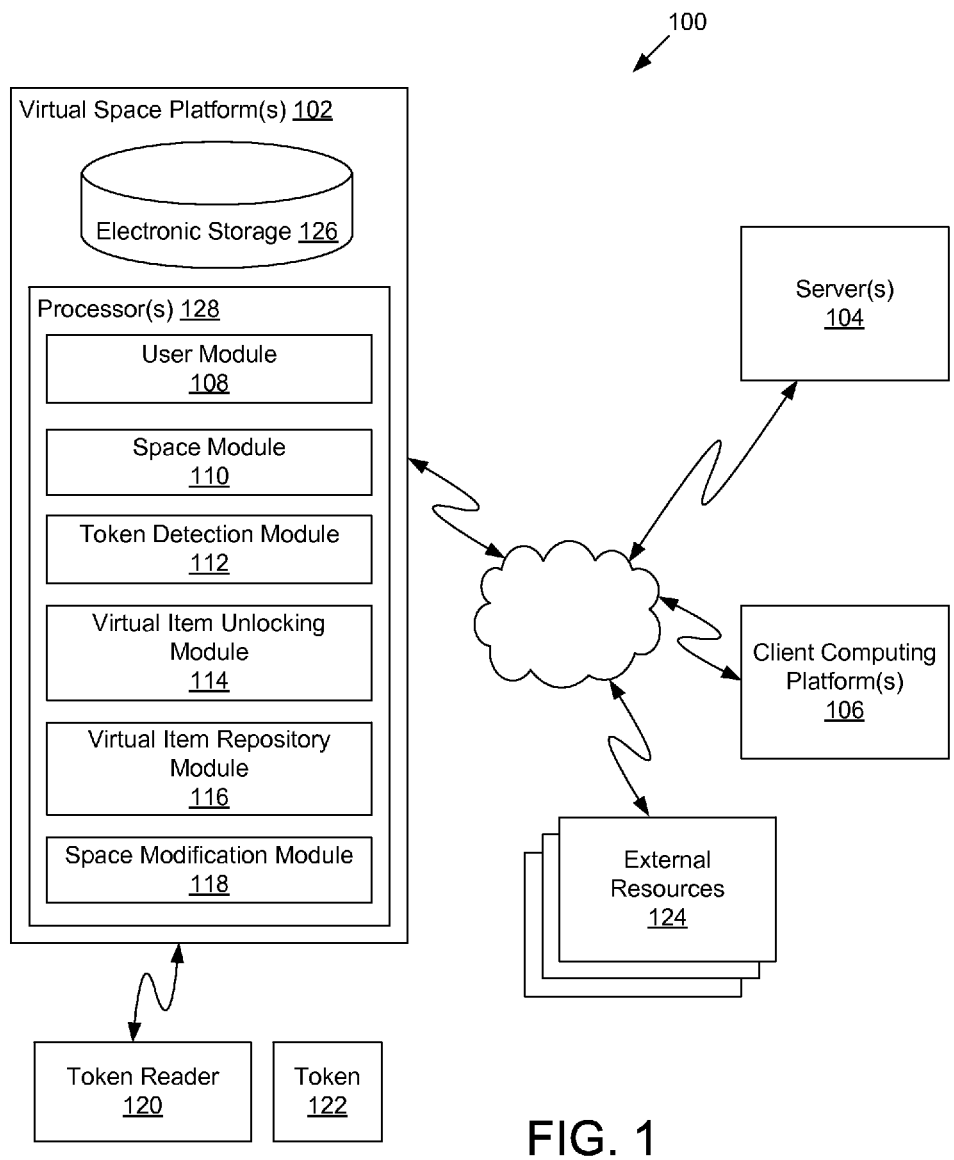
FIG. 1 illustrates a system configured to unlock virtual items in a virtual space responsive to physical token detection, provide a common virtual item repository in a virtual space, and/or facilitate customization of a virtual space based on accessible virtual items, in accordance with one or more implementations.

FIG. 1 illustrates a system 100 configured to unlock virtual items in a virtual space responsive to physical token detection, provide a common virtual item repository in a virtual space, and/or facilitate customization of a virtual space based on accessible virtual items, in accordance with one or more implementations. In exemplary implementations, virtual items may be unlocked in the virtual space responsive to physical token detection. A common virtual item repository may be provided in the virtual space. Once unlocked, a given virtual item may be accessible to multiple characters in the virtual space via the virtual item repository. Customization of a virtual space may be facilitated. The customization may be based on the virtual items accessible via the virtual item repository.

A given token may be configured to depict a given character and/or a given virtual item. By way of non-limiting example, the given character may be Captain Jack Sparrow, the fictional character and protagonist of the Pirates of the Caribbean film series. The given virtual item may be an accessory associated with Captain Jack Sparrow, such as a sword. The given token may be a toy figurine embodying the appearance of Captain Jack Sparrow and/or the sword. The toy figurine may be configured to be detected by a token reader. In some implementations, the toy figurine may be disposed upon the token reader in order for it to be detected. The sword may be made accessible in the virtual space responsive to the toy figurine being detected.

According to some implementations, responsive to the toy figurine being detected, the sword may be made accessible to multiple characters in the virtual space via the virtual item repository. That is, access to the sword via the virtual item repository may be granted to one or more characters associated with users other than the one that possesses the detected token corresponding to the sword. In some implementations, modifications may be made to the virtual space based on the virtual items accessible via the virtual item repository. Such modifications may be made automatically and/or may be based on user input. For example, a given modification based on the accessibility of the sword may include a modification to the theme of the virtual space so that it includes elements of the Pirates of the Caribbean theme.

The system 100 may include one or more virtual space platforms 102. In some implementations, virtual space platform(s) 102 may be one or more servers (e.g., server(s) 104) configured to communicate with one or more client computing platform (e.g., client computing platforms 106) according to a client/server architecture. According to some implementations, virtual space platform(s) 102 may be one or more client computing platforms (e.g., client computing platforms 106). In some implementations, virtual space platform(s) 102 may communicate with other virtual space platform(s) 102 according to a peer-to-peer architecture. The users may access system 100 and/or the virtual space via the virtual space platform(s) 102 and/or client computing platform(s) 106.

The virtual space platform(s) 102 may be configured to execute one or more computer program modules. The computer program modules may include one or more of a user module 108, a space module 110, a token detection module 112, a virtual item unlocking module 114, a virtual item repository module 116, a space modification module 118, and/or other modules.

The user module 108 may be configured to access and/or manage one or more user profiles and/or user information associated with users of system 100. The one or more user profiles and/or user information may include information stored by virtual space platform(s) 102 and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

The space module 110 may be configured to implement the instance of the virtual space executed by the computer modules to determine views of the virtual space. In some implementations, the views may then be communicated (e.g., via streaming, via object/position data, and/or other information) from server(s) 104 to client computing platform(s) 106 for presentation to users. The view determined and presented to a given user may correspond to a user character being controlled by the given user. The view determined and presented to the given user may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via virtual space platform(s) 102 and/or clients (e.g., client computing platform(s) 106) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are determined by space module 110 is not intended to be limiting. The space module 110 may be configured to express the virtual space in a more limited, or richer, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module 110, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through virtual space platform(s) 102 and/or clients (e.g., client computing platform(s) 106). The users may interact with each other through communications exchanged within the virtual space. Such communications may include one or more of textual chat, instant messages, private messages, voice communications, and/or other communications. Communications may be received and entered by the users via their respective virtual space platform(s) 102 and/or client(s) (e.g., client computing platform(s) 106). Communications may be routed to and from the appropriate users through virtual space platform(s) 102 (e.g., through space module 110).

The token detection module 112 may be configured to detect tokens based on signals received from a token reader 120. A given token (e.g., token 122) may be a standalone physical object. The given token may be associated with a given character and/or a given virtual item. The given virtual item may be associated with the given character. In some implementations, the given virtual item may be associated with the given character based on a theme shared by the given virtual item and the given character. By way of non-limiting example, the given character may be Buzz Lightyear, the fictional character and deuteragonist of the Toy Story film series. The given virtual item may be the handheld "Blaster" used by Buzz Lightyear in the Toy Story film series. The character Buzz Lightyear and the virtual item Blaster share the theme of the Toy Story film series. Two different virtual items may have different themes. For example, the sword associated with Captain Jack Sparrow has a different theme than the Blaster associated with Buzz Lightyear. In some implementations, the given token may be configured to depict the given character and/or the given virtual item. The given virtual item may be accessible in the virtual space responsive to the given token being detected. Examples of the given token may include one or more of a toy figurine, a toy accessory, a coin, and/or other form factors suitable to be tokens as described herein.

Individual tokens may be configured to be detectable by token reader 120. In some implementations, detection of a given token may be based on a shape of a portion of the given token. In some implementations, a given token may be detectable based on a given signal conveying information associated with the given token. Detection of a given token may be facilitated by electronics embedded within or otherwise included in the given token. For example, the given token may include a radio-frequency identification (RFID) chip configured to emit radio-frequency electromagnetic fields responsive to the given token being disposed in a proximity of token reader 120. As another example, the given token may include an integrated circuit configured to transfer information associated with the given token responsive to the given token being placed in contact with a portion of token reader 120.

According to some implementations, virtual space content associated with virtual items and/or other virtual space content may be stored at a location other than one or more of the tokens. That is, a given token may not store virtual space content. A given token may store information used to detect the given token. A given token may not store information other than what may be used to detect the given token. Virtual space content may be information used by space module 110 to affect views and/or gameplay of the virtual space. Such virtual space content may be stored by the virtual space platform(s) and/or by one or more other components of system 100.

The token reader 120 may be configured to provide signals associated with individual tokens. For example, a given signal associated with a given token may convey information associated with the given token. In some implementations, token reader 120 may be configured to provide a first signal responsive to one or more of (1) a first token abutting a portion of the token reader, (2) the first token being disposed in a proximity of the token reader, and/or other actions configured to facilitate detection of the first token. According to some implementations, token reader 120 may be a peripheral device configured to be communicatively coupled with one or more components of system 100. In some implementations, token reader 120 may be integrated so as to form a singular device with a component of system 100 (e.g., a given virtual space platform 102).

The virtual item unlocking module 114 may be configured to unlock individual ones of a plurality of virtual items responsive to individual tokens being detected. Where the plurality of virtual items include the first virtual item and a second virtual item, the first virtual item may be unlocked responsive to the first token being detected and the second virtual item may be unlocked responsive to the second token being detected. The plurality of virtual items may include one or more of an accessory, a virtual good, and/or other virtual items. A previously-locked virtual item may become accessible to one or more characters responsive to being unlocked. That is, until a given virtual item is unlocked, it may not be accessible to any characters. In some implementations, a given character accessing a given virtual item may include the given character utilizing the given virtual item. For example, Captain Jack Sparrow may grab the sword and use it in a duel, or Buzz Lightyear may take hold of the Blaster and use it against a foe.

In some implementations, the plurality of virtual items may include a third virtual item. The third virtual item may be unlocked responsive to two or more tokens (e.g., the first token and the second token) being detected. The two or more tokens may be detected by the same token reader 120 and/or by token readers 120 associated with different virtual space platforms 102. The third virtual item may embody a combination of a first theme of the first character and a second theme of the second character. By way of non-limiting example, the third virtual item may be an accessory that combines certain features of the sword and the Blaster.

According to some implementations, virtual item unlocking module 114 may be configured to unlock individual ones of the plurality of virtual items responsive to a performance of one or more game mechanisms associated with the virtual space. A game mechanism may include an action, a mission, a quest, a task, and/or other game mechanism. In some implementations, unlocking a given virtual item may require both a given token being detected and a given game mechanism being performed.

The virtual item repository module 116 may be configured to provide a virtual item repository within the virtual space. The virtual item repository may be configured to facilitate and/or provide access by a plurality of characters to a plurality of virtual items. Where the plurality of characters include the first character and the second character, the plurality of virtual items may include a first virtual item associated with the first character and a second virtual item associated with the second character. The first virtual item may be accessible to the second character via the virtual item repository. The second virtual item may be accessible to the first character via the virtual item repository.

In some implementations, the virtual item repository may be visually represented at a location within the virtual space. By way of non-limiting example, the virtual item repository may be visually represented as a toy box within the virtual space. In some implementations, a given character may be required to be located proximally with the visual representation of the virtual item repository in order to access individual ones of the plurality of virtual items. For example, the given character may be required to stand next to, enter, and/or otherwise be located proximally with the visual representation of the virtual item repository in order to access a given virtual item.

According to some implementations, individual ones of the plurality of virtual items made accessible by the virtual item repository may be accessible to a given character via an inventory associated with the given character. The inventory may be accessible via a menu and/or other interface associated with the virtual space.

Accessibility of virtual items via the virtual item repository may vary according to different implementations. In some implementations, the virtual item repository may be configured such that a given virtual item is accessed by two or more characters at a given time. In some implementations, the virtual item repository may be configured such that a given virtual item is accessed by one single character at a given time. The one single character may be required to relinquish the given virtual item in order for the given virtual item to be accessed by another character.

The space modification module 118 may be configured to facilitate modifications to one or more aspects of the virtual space. The one or more aspects of the virtual space may include objectives associated with the virtual space, an environment of the virtual space, a theme of the virtual space, and/or other aspects of the virtual space. Generally speaking, a given objective may be a purpose or goal that efforts or actions within the virtual space are intended to attain or accomplish. By way of non-limiting example, an objective may include a set of actions that must be performed by a user character in order to advance to a next level of gameplay in the virtual space.

The environment may be an aggregate of surroundings and conditions of the virtual space. By way on non-limiting example, the surroundings of the virtual space may include one or more of the appearance of the virtual space, a color scheme of the virtual space, a sound and/or soundtrack associated with the virtual space, and/or other aspects of the surroundings of the virtual space. The conditions of the virtual space may include one or more of laws of nature (e.g., gravity) of the virtual space, weather depicted in the virtual space, and/or other aspects of the conditions of the virtual space. Modifying the environment may include modifying one or both of the surroundings or the conditions of the virtual space.

The theme of the virtual space may be a unifying subject associated with the virtual space. A given character may be one of a given plurality of characters associated with a given theme. By way of non-limiting example, where the first character is Captain Jack Sparrow and the second character is Buzz Lightyear, the first theme may relate to Pirates of the Caribbean and the second theme may relate to Toy Story. Modifying the theme of the virtual space based on the given theme may include incorporating one or more attributes of the given theme in the theme of the virtual space. Examples of such attributes may include one or more of objects, designs, symbols, color schemes, music, and/or other attributes that identify a given theme.

Modifications to the virtual space may be based on individual ones of the plurality of virtual items made accessible by the virtual item repository. For example, in some implementations, a given virtual item having a given theme may be required to be accessible via the virtual item repository in order for a thematic modification to the virtual space based on the given theme to be effectuated. The modifications to the virtual space may be made automatically based on individual ones of the plurality of virtual items made accessible by the virtual item repository.

In some implementations, space modification module 118 may be configured such that modifications made to one or more aspects of the virtual space are associated with individual characters. That is, a first modification associated with the first character may cause the virtual space to be perceived in a first manner by the first character. A second modification associated with the second character may cause the virtual space to be perceived in a second manner by the second character. The first manner may be different from the second manner. By way of non-limiting example, the first character may perceive the virtual space at nighttime, while the second character may perceive the virtual space in the daytime. The first character may perceive the virtual space in the first manner responsive to accessing a given virtual item. The second character may perceive the virtual space in the second manner responsive to accessing another given virtual item.

The space modification module 118 may be configured to provide a space editor interface. The space editor interface may be configured to receive user input associated with the one or more aspects of the virtual space. Modifications to the virtual space may be based on the user input. In some implementations, the user input may be restricted based on individual ones of the plurality of virtual items made accessible by the virtual item repository. The user input provided by a given user may be restricted based on one or more virtual items accessed by a given character, where the given character is associated with the given user.

Figure 2:
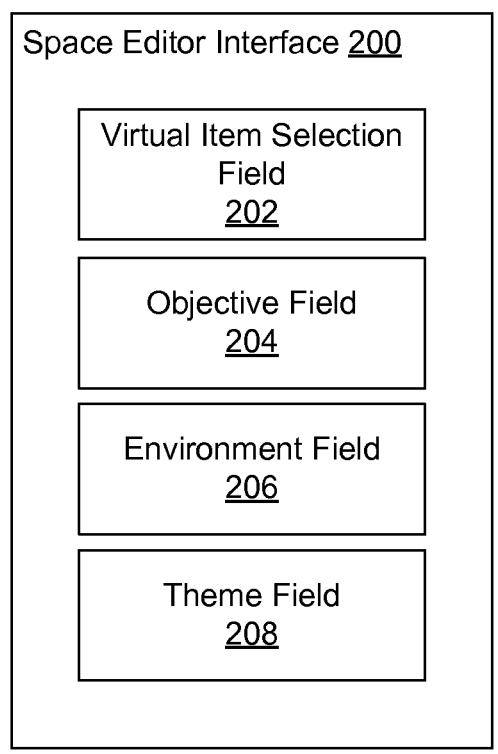
FIG. 2 illustrates a space editor interface, in accordance with one or more implementations.

FIG. 2 illustrates a space editor interface 200, in accordance with one or more implementations. The space editor interface 200 may be presented via virtual space platform(s) 102 and/or client computing platform(s) 106. As depicted in FIG. 2, user selection interface 200 may include one or more of a virtual item selection field 202, an objective field 204, an environment field 206, a theme field 208, and/or other fields and/or information. The depiction of user selection interface 200 in FIG. 2 is not intended to be limiting as one or more of fields 202, 204, 206, and/or 208 may be omitted or combined with another field.

The virtual item selection field 202 may be configured to provide, for presentation, information associated with virtual items accessed by a given character. In some implementation, virtual item selection field 202 may facilitate selection of one or more virtual items to be accessed by a given character. The virtual item selection field 202 may be provided by, or in conjunction with, a virtual item repository module that is the same as or similar to virtual item repository module 116, in accordance with one or more implementations.

The objective field 204 may be configured to receive user input associated with the objectives effectuated in the virtual space. In some implementations, the user input as to objectives may be restricted based on (1) which virtual items are made accessible by the virtual item repository and/or (2) which virtual items are accessed by a given character. The objective field 204 may be provided by, or in conjunction with, a space modification module that is the same as or similar to space modification module 118, in accordance with one or more implementations.

The environment field 206 may be configured to receive user selections associated with modifications to the environment of the virtual space. In some implementations, the user input as to the environment may be restricted based on (1) which virtual items are made accessible by the virtual item repository and/or (2) which virtual items are accessed by a given character. The environment field 206 may be provided by, or in conjunction with, a space modification module that is the same as or similar to space modification module 118, in accordance with one or more implementations.

The theme field 208 may be configured to receive user selections associated with the theme of the virtual space. In some implementations, the user input as to the theme may be restricted based on (1) which virtual items are made accessible by the virtual item repository and/or (2) which virtual items are accessed by a given character. The theme field 208 may be provided by, or in conjunction with, a space modification module that is the same as or similar to space modification module 118, in accordance with one or more implementations.

In some implementations, two or more components of system 100 (e.g., virtual space platform(s) 102, server(s) 104, client computing platform(s) 106, token reader 120, and/or external resources 124) may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which two or more components of system 100 may be operatively linked via some other communication media.

A given server 104 may include one or more processors configured to execute computer program modules. The computer program modules may be configured to enable an expert or user associated with the given server 104 to interface with system 100 and/or external resources 124, and/or provide other functionality attributed herein to server(s) 104.

A given client computing platform 106 may include one or more processors configured to execute computer program modules. The computer program modules may be configured to enable an expert or user associated with the given client computing platform 106 to interface with system 100 and/or external resources 124, and/or provide other functionality attributed herein to client computing platform(s) 106. By way of non-limiting example, the given client computing platform 106 may include one or more of a desktop computer, a laptop computer, a handheld computer, a NetBook, a Smartphone, a gaming console, and/or other computing platforms.

The external resources 124 may include sources of information, hosts and/or providers of virtual environments outside of system 100, external entities participating with system 100, and/or other resources. In some implementations, some or all of the functionality attributed herein to external resources 124 may be provided by resources included in system 100.

The virtual space platform(s) 102 may include electronic storage 126, one or more processors 128, and/or other components. The virtual space platform(s) 102 may include communication lines, or ports to enable the exchange of information with a network and/or other computing platforms. Illustration of virtual space platform(s) 102 in FIG. 1 is not intended to be limiting. The virtual space platform(s) 102 may include a plurality of hardware, software, and/or firmware components operating together to provide the functionality attributed herein to virtual space platform(s) 102. For example, virtual space platform(s) 102 may be implemented by a cloud of computing platforms operating together as virtual space platform(s) 102.

Electronic storage 126 may comprise electronic storage media that electronically stores information. The electronic storage media of electronic storage 126 may include one or both of system storage that is provided integrally (i.e., substantially non-removable) with virtual space platform(s) 102 and/or removable storage that is removably connectable to virtual space platform(s) 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 126 may include one or more virtual storage resources (e.g., cloud storage, a virtual private network, and/or other virtual storage resources). Electronic storage 126 may store software algorithms, information determined by processor(s) 128, information received from one or more other components of system 100, and/or other information that enables virtual space platform(s) 102 to function as described herein.

The processor(s) 128 may be configured to provide information processing capabilities in virtual space platform(s) 102. As such, processor(s) 128 may include one or more of a digital processor, an analog processor, a digital circuit designed to process information, an analog circuit designed to process information, a state machine, and/or other mechanisms for electronically processing information. Although processor(s) 128 is shown in FIG. 1 as a single entity, this is for illustrative purposes only. In some implementations, processor(s) 128 may include a plurality of processing units. These processing units may be physically located within the same device, or processor(s) 128 may represent processing functionality of a plurality of devices operating in coordination. The processor(s) 128 may be configured to execute modules 108, 110, 112, 114, 116, 118, and/or other modules. The processor(s) 128 may be configured to execute modules 108, 110, 112, 114, 116, 118, and/or other modules by software; hardware; firmware; some combination of software, hardware, and/or firmware; and/or other mechanisms for configuring processing capabilities on processor(s) 128.

It should be appreciated that although modules 108, 110, 112, 114, 116, and 118 are illustrated in FIG. 1 as being co-located within a single processing unit, in implementations in which processor(s) 128 includes multiple processing units, one or more of modules 108, 110, 112, 114, 116, and/or 118 may be located remotely from the other modules. The description of the functionality provided by the different modules 108, 110, 112, 114, 116, and/or 118 described herein is for illustrative purposes, and is not intended to be limiting, as any of modules 108, 110, 112, 114, 116, and/or 118 may provide more or less functionality than is described. For example, one or more of modules 108, 110, 112, 114, 116, and/or 118 may be eliminated, and some or all of its functionality may be provided by other ones of modules 108, 110, 112, 114, 116, and/or 118. As another example, processor(s) 128 may be configured to execute one or more additional modules that may perform some or all of the functionality attributed below to one of modules 108, 110, 112, 114, 116, and/or 118.

Figure 3:
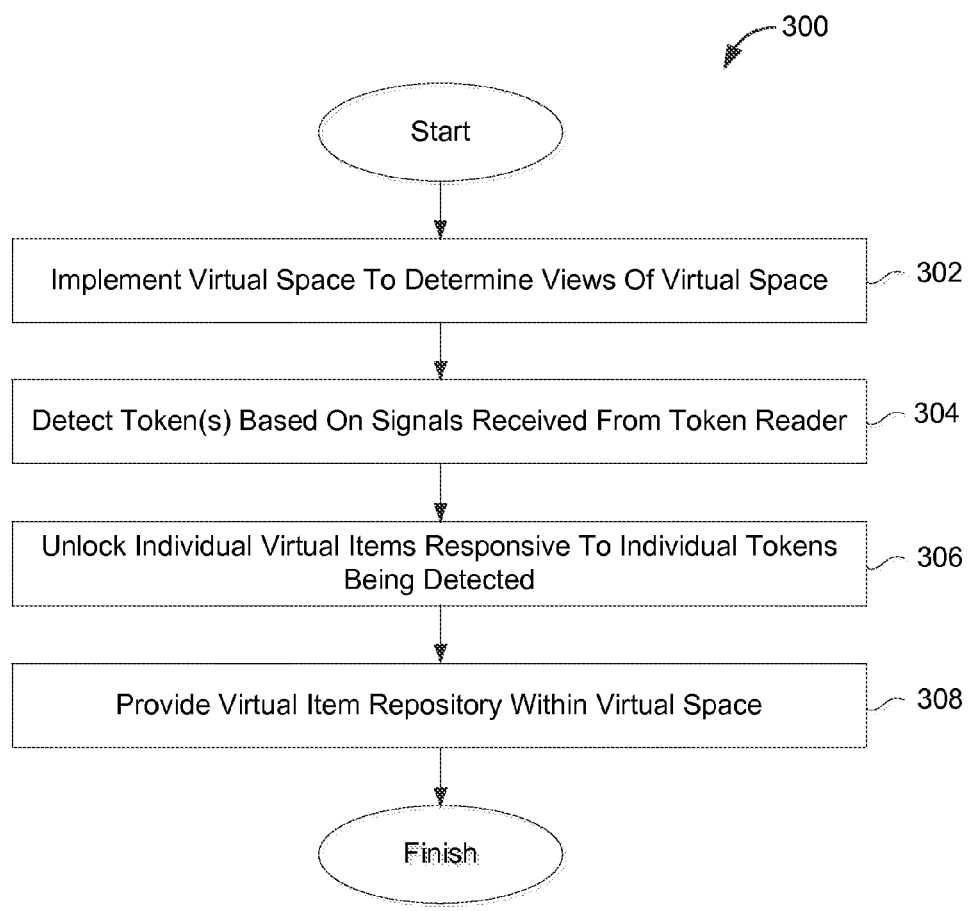
FIG. 3 illustrates a method to provide a common virtual item repository in a virtual space, in accordance with one or more implementations.
Figure 4:
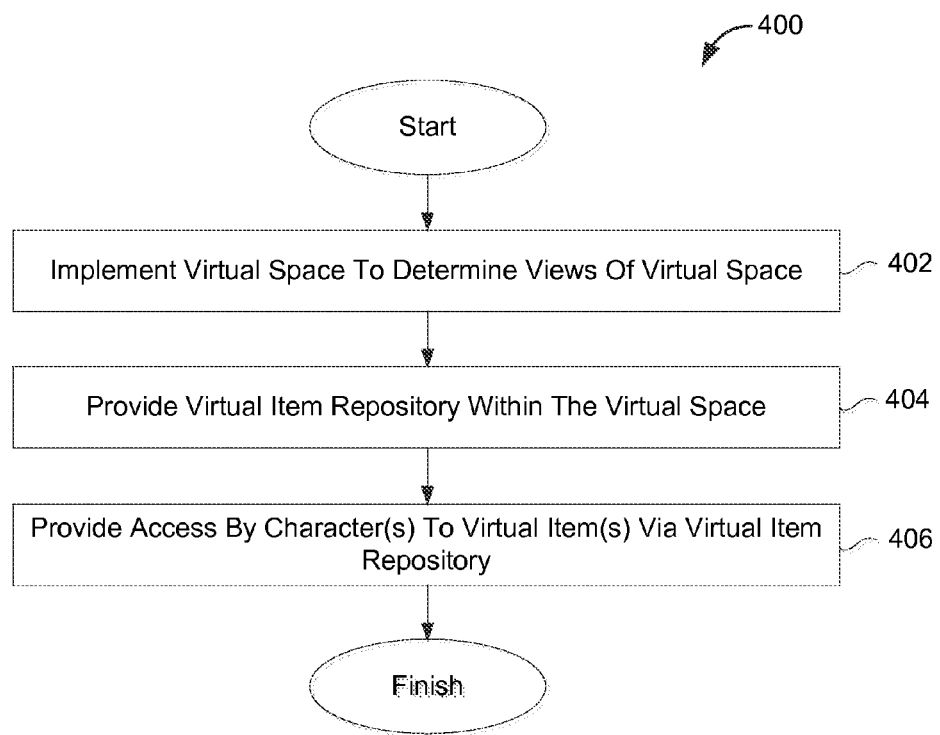
FIG. 4 illustrates a method to unlock virtual items in a virtual space responsive to physical token detection, in accordance with one or more implementations.
Figure 5:
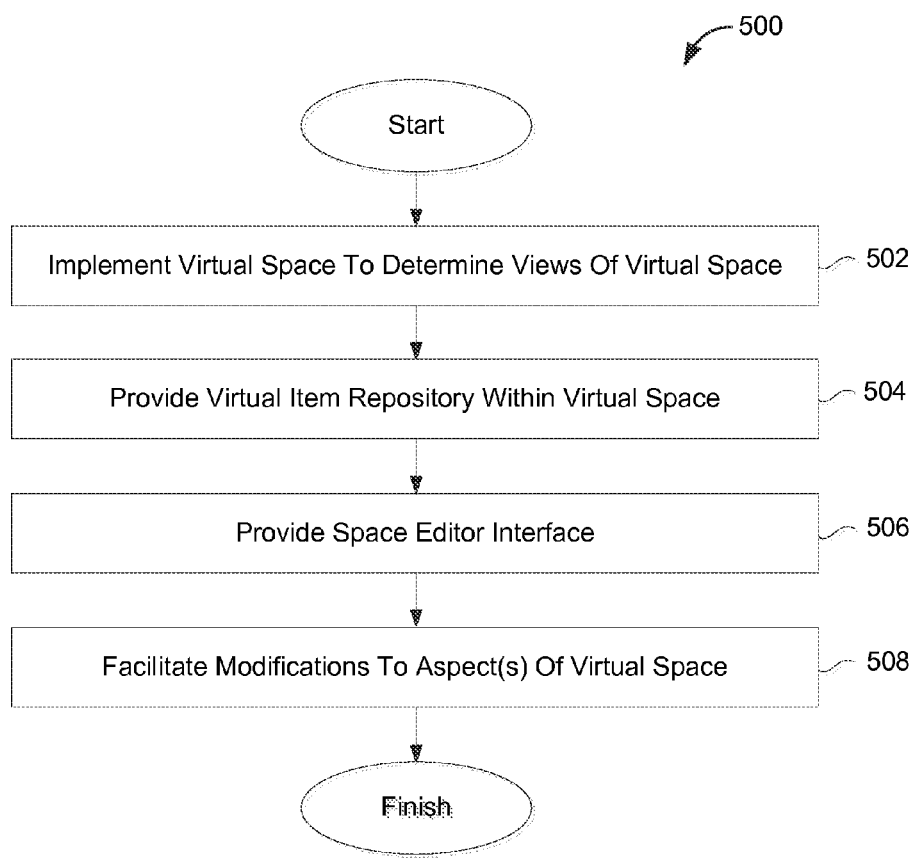
FIG. 5 illustrates a method to facilitate customization of a virtual space, in accordance with one or more implementations.

FIG. 3 illustrates a method 300, FIG. 4 illustrates a method 400, and FIG. 5 illustrates a method 500, in accordance with one or more implementations. The operations of method 300, method 400, and/or method 500 presented below are intended to be illustrative. In some embodiments, method 300, method 400, and/or method 500 may be accomplished with one or more additional operations not described, and/or without one or more of the operations discussed. Additionally, the order in which the operations of method 300, method 400, and/or method 500 are respectively illustrated in FIG. 3, FIG. 4, and/or FIG. 5 and described below is not intended to be limiting.

In some embodiments, method 300, method 400, and/or method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300, method 400, and/or method 500 in response to instructions stored electronically on an electronic storage medium. The one or more processing devices may include one or more devices configured through hardware, firmware, and/or software to be specifically designed for execution of one or more of the operations of method 300, method 400, and/or method 500.

The method 300, illustrated in FIG. 3, is for unlocking virtual items in a virtual space responsive to physical token detection, in accordance with one or more implementations.

At an operation 302, the virtual space may be implemented to determine views of the virtual space. Operation 302 may be performed by a space module that is the same as or similar to space module 110, in accordance with one or more implementations.

At an operation 304, one or more tokens may be detected based on signals received from a token reader. A given token may be associated with a given character and/or a given virtual item. The given virtual item may be associated with the given character. Operation 304 may be performed by a token detection module that is the same as or similar to token detection module 112, in accordance with one or more implementations.

At an operation 306, individual virtual items may be unlocked responsive to individual tokens being detected. Operation 306 may be performed by a virtual item unlocking module that is the same as or similar to virtual item unlocking module 114, in accordance with one or more implementations.

At an operation 308, a virtual item repository may be provided within the virtual space. The virtual item repository may be configured to facilitate access by characters to the unlocked virtual items. Operation 308 may be performed by a virtual item repository module that is the same as or similar to virtual item repository module 116, in accordance with one or more implementations.

The method 400, illustrated in FIG. 4, is for providing a common virtual item repository in a virtual space, in accordance with one or more implementations.

At an operation 402, the virtual space may be implemented to determine views of the virtual space. Operation 402 may be performed by a space module that is the same as or similar to space module 110, in accordance with one or more implementations.

At an operation 404, a virtual item repository may be provided within the virtual space. Operation 404 may be performed by a virtual item repository module that is the same as or similar to virtual item repository module 116, in accordance with one or more implementations.

At an operation 406, access by a plurality of characters to a plurality of virtual items may be provided via the virtual item repository. Operation 406 may be performed by a virtual item repository module that is the same as or similar to virtual item repository module 116, in accordance with one or more implementations.

The method 500, illustrated in FIG. 5, is for facilitating customization of a virtual space based on accessible virtual items, in accordance with one or more implementations.

At an operation 502, the virtual space may be implemented to determine views of the virtual space. Operation 502 may be performed by a space module that is the same as or similar to space module 110, in accordance with one or more implementations.

At an operation 504, a virtual item repository may be provided within the virtual space. The virtual item repository may be configured to provide access by a plurality of characters to a plurality of virtual items. Operation 504 may be performed by a virtual item repository module that is the same as or similar to virtual item repository module 116, in accordance with one or more implementations.

At an operation 506, a space editor interface may be provided. The space editor interface may be configured to receive user input associated with the one or more aspects of the virtual space. The modifications to the virtual space may be based on the user input. Operation 506 may be performed by a space modification module that is the same as or similar to space modification module 118, in accordance with one or more implementations.

At an operation 508, modifications may be facilitated to one or more aspects of the virtual space. The modifications may be based on individual ones of the plurality of virtual items made accessible by the virtual item repository. Operation 508 may be performed by a space modification module that is the same as or similar to space modification module 118, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to provide a common virtual item repository in a virtual space, the system comprising: one or more processors configured to execute computer program instructions, the computer program instructions comprising: a space component configured to implement the virtual space to determine views of the virtual space; and a virtual item repository component configured to present a virtual item repository within the virtual space such that the virtual item repository is visually represented as an object at a location within the virtual space, the virtual item repository being depicted as holding a plurality of virtual items, the virtual item repository being configured to provide access by a plurality of characters to individual ones of the plurality of virtual items depicted as being held by the virtual item repository such that a given virtual item is accessed by one single character at a given time, the plurality of characters including a first character and a second character depicted within the virtual space, the plurality of virtual items including a first virtual item associated with the first character and a second virtual item associated with the second character, the first virtual item being accessible to the second character via the virtual item repository only after the first character has relinquished the first virtual item, and the second virtual item being accessible to the first character via the virtual item repository only after the second character has relinquished the second virtual item; wherein the first virtual item is associated with the first character based on a first theme shared by the first virtual item and the first character, the second virtual item is associated with the second character based on a second theme shared by the second virtual item and the second character, and the first theme is different than the second theme.

2. The system of claim 1, wherein the plurality of virtual items include one or both of an accessory or a virtual good.

3. The system of claim 1, wherein a given character accessing a given virtual item includes the given character utilizing the given virtual item.

4. The system of claim 1, wherein a given character must be located proximally with the visual representation of the virtual item repository in order to access individual ones of the plurality of virtual items.

5. The system of claim 1, wherein individual ones of the plurality of virtual items made accessible by the virtual item repository are accessible to a given character via an inventory associated with the given character.

6. The system of claim 1, wherein the virtual item repository is configured such that a given virtual item is accessed by one single character at a given time.

7. The system of claim 6, wherein the one single character must relinquish the given virtual item in order for the given virtual item to be accessed by another character.

8. The system of claim 1, wherein the virtual item repository is configured such that a given virtual item is accessed by two or more characters at a given time.

9. The system of claim 1, wherein responsive to the first character accessing the second virtual item via the virtual item repository and the second character accessing the first virtual item via the virtual item repository, the first character and the second character perceive the virtual space differently.

10. A computer-implemented method to provide a common virtual item repository in a virtual space, the method being performed by one or more processors configured to execute computer program instructions, the method comprising: implementing, using one or more processors, the virtual space to determine views of the virtual space; and presenting, using one or more processors, a virtual item repository within the virtual space such that the virtual item repository is visually represented as an object at a location within the virtual space, the virtual item repository being depicted as holding a plurality of virtual items, the virtual item repository being configured to provide access by a plurality of characters to individual ones of the plurality of virtual items depicted as being held by the virtual item repository such that a given virtual item is accessed by one single character at a given time, the plurality of characters including a first character and a second character depicted within the virtual space, the plurality of virtual items including a first virtual item associated with the first character and a second virtual item associated with the second character, the first virtual item being accessible to the second character via the virtual item repository only after the first character has relinquished the first virtual item, and the second virtual item being accessible to the first character via the virtual item repository only after the second character has relinquished the second virtual item;

wherein the first virtual item is associated with the first character based on a first theme shared by the first virtual item and the first character, the second virtual item is associated with the second character based on a second theme shared by the second virtual item and the second character, and the first theme is different than the second theme.

11. The method of claim 10, wherein the plurality of virtual items include one or both of an accessory or a virtual good.

12. The method of claim 10, wherein a given character accessing a given virtual item includes the given character utilizing the given virtual item.

13. The method of claim 10, wherein a given character must be located proximally with the visual representation of the virtual item repository in order to access individual ones of the plurality of virtual items.

14. The method of claim 10, wherein individual ones of the plurality of virtual items made accessible by the virtual item repository are accessible to a given character via an inventory associated with the given character.

15. The method of claim 10, wherein the virtual item repository is configured such that a given virtual item is accessed by one single character at a given time.

16. The method of claim 15, wherein the one single character must relinquish the given virtual item in order for the given virtual item to be accessed by another character.

17. The method of claim 10, wherein the virtual item repository is configured such that a given virtual item is accessed by two or more characters at a given time.

* * * * *